United States Patent
Ward et al.

(10) Patent No.: US 10,725,786 B2
(45) Date of Patent: Jul. 28, 2020

(54) COMPLETION MECHANISM FOR A MICROPROCESSOR INSTRUCTION COMPLETION TABLE

(71) Applicant: International Business Machines Corporation, Armonk, NY (US)

(72) Inventors: Kenneth L. Ward, Austin, TX (US); Susan E. Eisen, Round Rock, TX (US); Dung Q. Nguyen, Austin, TX (US); Glenn O. Kincaid, Austin, TX (US); Joe Lee, Round Rock, TX (US); Deepak K. Singh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/109,952

(22) Filed: Aug. 23, 2018

(65) Prior Publication Data
US 2020/0065102 A1    Feb. 27, 2020

(51) Int. Cl.
*G06F 9/30* (2018.01)
*G06F 9/38* (2018.01)
*G06F 9/34* (2018.01)

(52) U.S. Cl.
CPC .............. *G06F 9/3857* (2013.01); *G06F 9/34* (2013.01); *G06F 9/3836* (2013.01)

(58) Field of Classification Search
None
See application file for complete search history.

(56) References Cited

U.S. PATENT DOCUMENTS

| 7,472,258 | B2 | 12/2008 | Burky et al. | |
|---|---|---|---|---|
| 9,565,013 | B2 | 2/2017 | Elko et al. | |
| 2004/0250050 | A1* | 12/2004 | Ludden | G06F 30/33 712/218 |
| 2006/0271820 | A1* | 11/2006 | Mack | G06F 11/1407 714/17 |
| 2010/0262967 | A1* | 10/2010 | Eisen | G06F 9/485 718/102 |

(Continued)

OTHER PUBLICATIONS

Anonymously; "A Device and Method for Eliminating Redundant Hardware by Utilizing a Vectorized Fixed Point Multiplier"; <http://ip.com/IPCOM/000239274D>; Oct. 24, 2014.

(Continued)

*Primary Examiner* — Corey S Faherty
(74) *Attorney, Agent, or Firm* — Patterson + Sheridan, LLP

(57) ABSTRACT

Method and apparatus for a completion mechanism for a microprocessor are provided by marking entries in a section of an Instruction Completion Table (ICT) as ready to complete using corresponding Ready to Complete (RTC) status bits; determining a tail pointer indicating a start of the entries in the ICT that are ready for completion in a current clock cycle; performing a counting leading ones on an RTC vector that organizes the RTC status bits according to a program order for completing the entries to determine a count leading ones pointer that indicates an end of the entries in the ICT that are ready for completion in the current clock cycle; completing instructions included in the entries between the tail pointer and the count leading ones pointer in one clock cycle; and updating the tail pointer to a value of the count leading ones pointer for a subsequent clock cycle.

20 Claims, 6 Drawing Sheets

(56) References Cited

U.S. PATENT DOCUMENTS

2011/0302392 A1* 12/2011 Abernathy ................ G06F 9/30
                                                                712/215
2016/0164659 A1   6/2016 Elko et al.
2019/0163488 A1*  5/2019 Karve ................... G06F 9/3855
2019/0187993 A1*  6/2019 Ward .................... G06F 9/3851
2020/0026521 A1*  1/2020 Ward .................... G06F 9/3861

OTHER PUBLICATIONS

Anonymously; "Method for Compound Implicit Branch Instruction for Microprocessors"; <http://ip.com/IPCOM/000128936D>; Sep. 21, 2005.

* cited by examiner

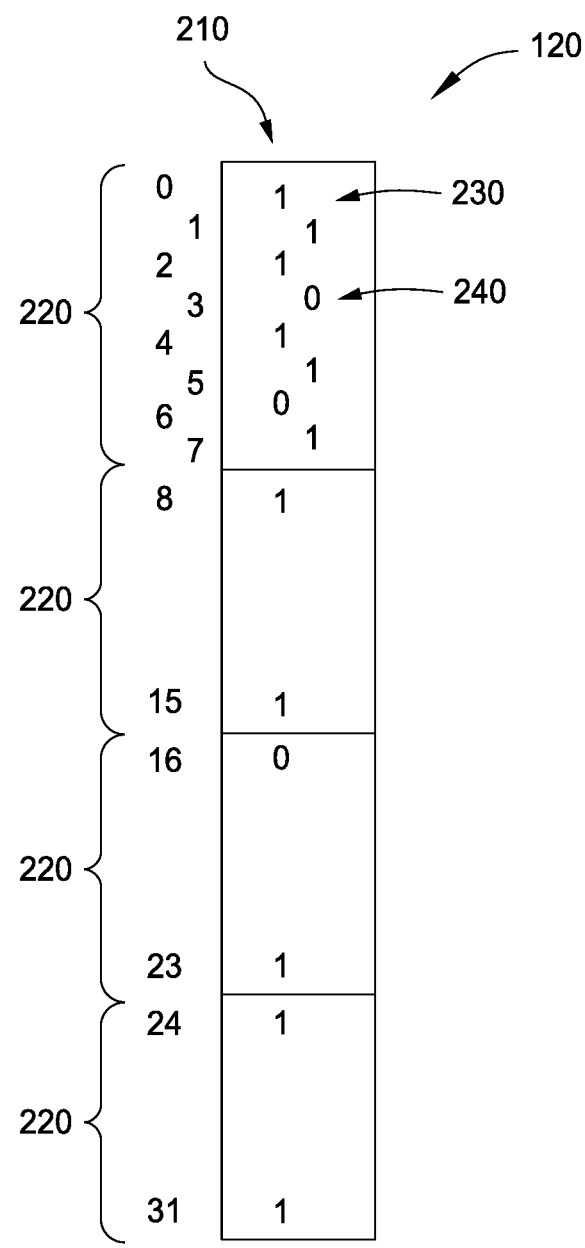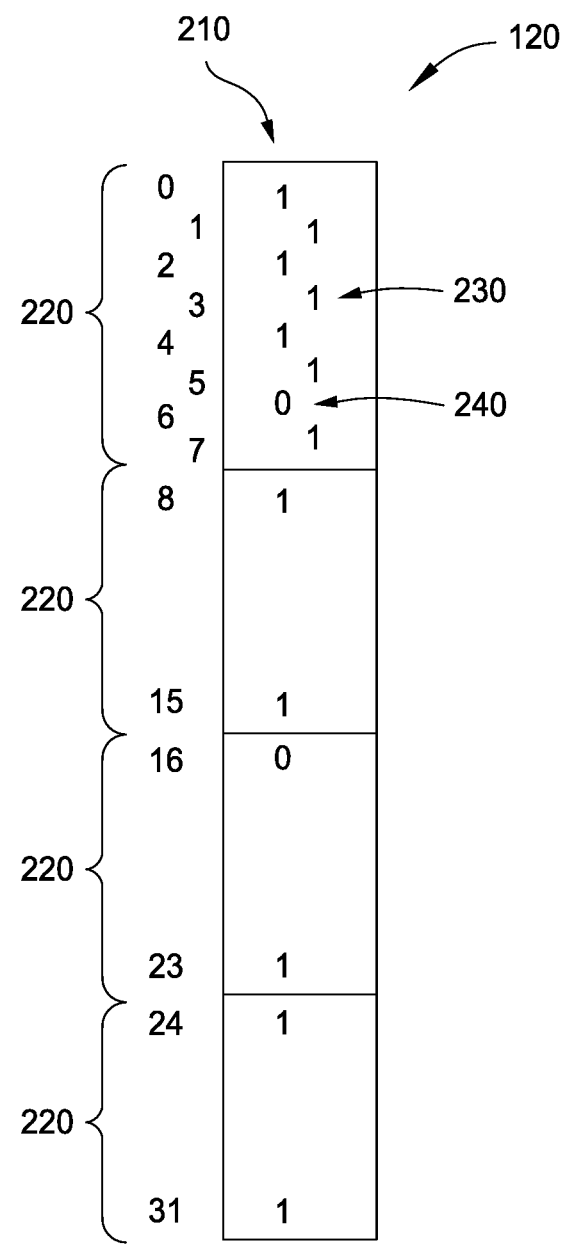
FIG. 2A
FIG. 2B

410

| | INPUTS | | | | | | | | OUTPUTS | | | |
|---|---|---|---|---|---|---|---|---|---|---|---|---|
| 1 | 2 | 3 | 4 | 5 | 6 | 7 | 8 | ALL1 | C1 | C2 | C3 |
| 0 | X | X | X | X | X | X | X | 0 | 0 | 0 | 0 |
| 1 | 0 | X | X | X | X | X | X | 0 | 0 | 0 | 1 |
| 1 | 1 | 0 | X | X | X | X | X | 0 | 0 | 1 | 0 |
| 1 | 1 | 1 | 0 | X | X | X | X | 0 | 0 | 1 | 1 |
| 1 | 1 | 1 | 1 | 0 | X | X | X | 0 | 1 | 0 | 0 |
| 1 | 1 | 1 | 1 | 1 | 0 | X | X | 0 | 1 | 0 | 1 |
| 1 | 1 | 1 | 1 | 1 | 1 | 0 | X | 0 | 1 | 1 | 0 |
| 1 | 1 | 1 | 1 | 1 | 1 | 1 | 0 | 0 | 1 | 1 | 1 |
| 1 | 1 | 1 | 1 | 1 | 1 | 1 | 1 | 1 | 0 | 0 | 0 |

FIG. 4A

COMPLETION MECHANISM FOR A MICROPROCESSOR INSTRUCTION COMPLETION TABLE

BACKGROUND

The present disclosure relates to processors, and more specifically, to improvements in the functionality thereof in the handling of instructions for completion. Modern processors may complete multiple instructions per clock cycle. These processors may issue and finish instructions out of order relative to the order specified in a program using those instructions (a program order), and may have many instructions in-process at any given time.

SUMMARY

According to one embodiment of the present invention, a method is provided for competing instructions in a microprocessor, the method comprising: marking entries in a section of an Instruction Completion Table (ICT) as ready to complete using corresponding Ready to Complete (RTC) status bits; determining a tail pointer indicating a start of the entries in the ICT that are ready for completion in a current clock cycle; performing a counting leading ones on an RTC vector that organizes the RTC status bits according to a program order for completing the entries to determine a count leading ones pointer that indicates an end of the entries in the ICT that are ready for completion in the current clock cycle; completing instructions included in the entries between the tail pointer and the count leading ones pointer in one clock cycle; and updating the tail pointer to a value of the count leading ones pointer for a subsequent clock cycle.

In another embodiment of the present invention, a system is provided for competing instructions in a microprocessor, the system comprising: an Instruction Completion Table (ICT) including a plurality of entries arranged in a program order for completion; a Ready to Complete (RTC) vector including a plurality of RTC status bits corresponding to the plurality of entries included in the ICT; and a controller, embodying logic that enables the controller in a given clock cycle to: mark one or more entries of the ICT being ready to complete using a corresponding one or more RTC status bits; determine a tail pointer that indicates a start position for completion in the ICT in the given clock cycle; count leading ones in the RTC vector to determine a count leading ones pointer that indicates an end position for completion in the ICT in the given clock cycle; complete the instructions included in the entries from the tail pointer to the count leading ones pointer; and update the tail pointer to a value of the count leading ones pointer for a subsequent clock cycle.

In a further embodiment of the present invention, a computer program product is provided for competing instructions in a microprocessor, the computer program product comprising: a computer-readable storage medium having computer-readable program code embodied therewith, the computer-readable program code executable by one or more computer processors to: mark entries in a section of an Instruction Completion Table (ICT) as ready to complete based on the instruction included in the entries having finished processing, wherein a given entry is marked as ready to complete via a corresponding Ready to Complete (RTC) status bit being set; determine a tail pointer that indicates a start position in the ICT in a current clock cycle; perform a counting leading ones on an RTC vector including the RTC status bits organized according to a program order for completing the entries to determine a count leading ones pointer that indicates an end position in the ICT in the current clock cycle; complete the instructions included in the entries from the tail pointer to the count leading ones pointer; and update the tail pointer to a value of the count leading ones pointer for a subsequent clock cycle

BRIEF DESCRIPTION OF THE SEVERAL VIEWS OF THE DRAWINGS

FIGS. 2A and 2B illustrate example Ready to Complete vectors, according to aspects of the present disclosure.

FIGS. 4A and 4B illustrate logic diagrams, according to aspects of the present disclosure.

DETAILED DESCRIPTION

To ensure that the instructions handled by a processor complete in program order, despite being handled in a potentially different order by the processor, the instructions are tracked in an Instruction Completion Table (ICT). The ICT for a processor may include references for several instructions in the program order for those instructions, and the statuses of those instructions.

As used herein, numbers in bases other than base ten are identified with a subscript identifying the base that should be used to interpret the number. For example, the number 11 will be understood to be a base ten representation of eleven, while $11_2$ will be understood to be a base two representation of three, while $11_{16}$ will be understood to be a base sixteen (hexadecimal) representation of seventeen. Examples given in the present disclosure that refer to an index or a position of a given value in an array or matrix shall begin at 0 (rather than 1), and the teachings provided by the present disclosure may be applied in embodiments using different indexing and/or ordering schemes than used in the examples. Example values for individual bits may be presented as $1_2$ for TRUE, $0_2$ for FALSE, or $x_2$ for immaterial (e.g., for placeholders or situations where the value of the individual bit does not affect an output), so that, for example, the value of $10x_2$ may include both $101_2$ (five) and $100_2$ (four).

To improve the functionality of computing devices in completing multiple instructions in a single clock cycle, the present disclosure provides systems and methods to quickly and accurately determine which instructions in an ICT to complete instructions up to. A Ready to Complete (RTC) status bit is associated with each entry in the ICT, which is set to $1_2$ when the instruction(s) included in the entry are ready to complete, and $0_2$ when the instruction(s) included in the entry are not ready to complete. The RTC bits are sticky; maintaining the assigned value after the instructions in the associated entry are completed, and maintains that value until the processor completes entries up to a specified boundary in the ICT. Knowledge of which section in the ICT is eligible for completion and which entries are or have been eligible for completion allows for a count leading ones operation to be performed to track the next eligible entry in the section ICT to complete. The count leading ones operation used in conjunction with 'sticky' or 'persistent' RTC bits removes the need to compute separate count and add operations on a prior tail pointer to track and update a completion window, thus improving the speed for the processor in handling asynchronously processed instruction for sequential completion.

Figure 1:
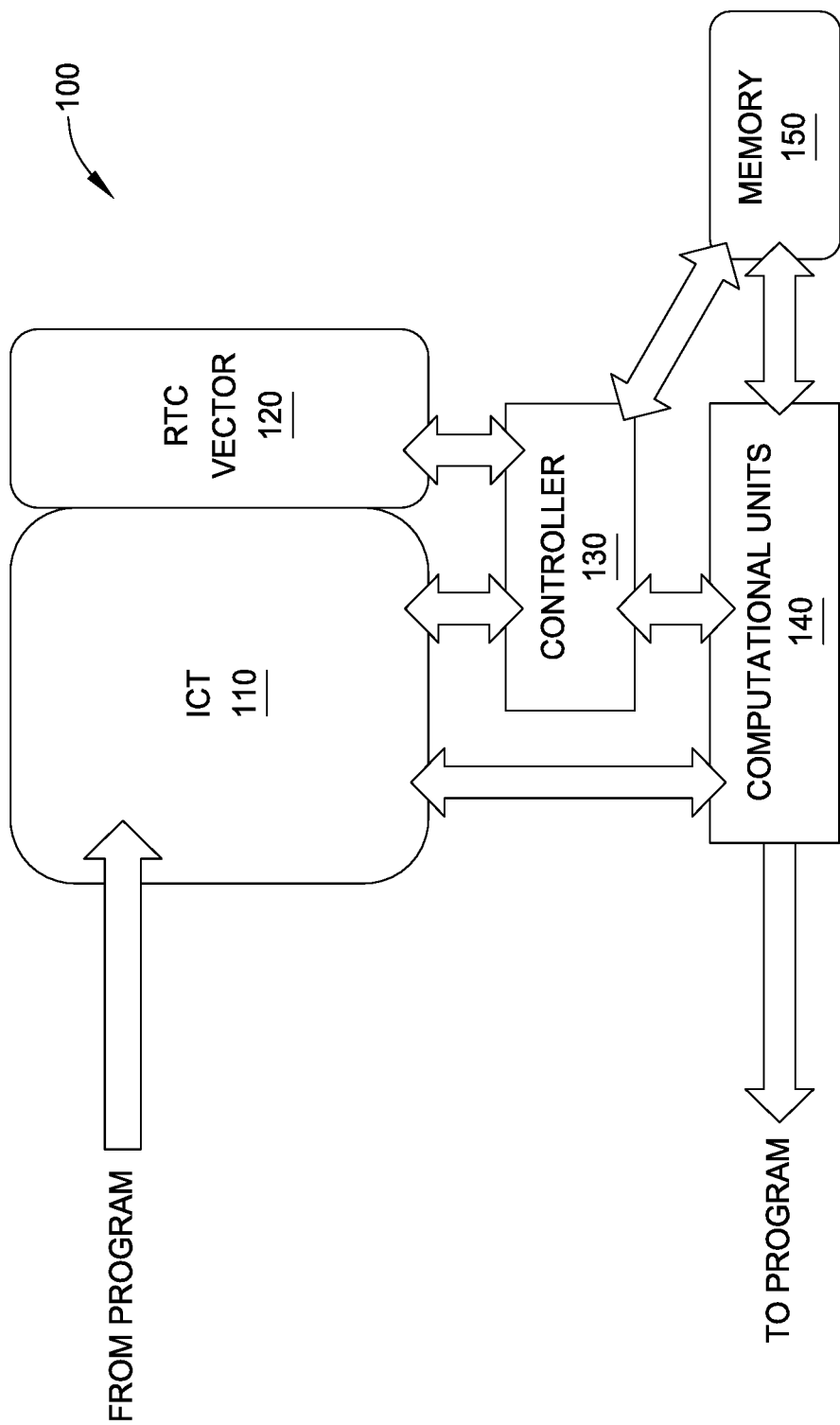
FIG. 1 illustrates a microprocessor unit, according to aspects of the present disclosure.

With reference now to FIG. 1, a microprocessor unit 100 is illustrated, as may be part of a computing device. An instruction completion table (ICT) 110 is organized as a circular list with each entry in the ICT 110 tracking a one or more instructions for the microprocessor unit 100 to track whether those instructions are ready for completion. Once an entry is completed, the instructions in that entry may be flushed so that the ICT 110 may reuse those entries for later instructions. The ICT 110 orders how the instructions are assigned to the entries in program order, although the individual instructions may be handled in any order. The program order specifies that an instruction held in an earlier entry is to be completed before an instruction held in a later entry for the orderly use of a program using the microprocessor unit 100 to perform calculations and hardware commands on behalf of that program.

A Ready to Complete (RTC) vector 120 is associated with the ICT 110 such that each entry in the RTC vector 120 is associated with the RTC status bits of the entries in the ICT 110. The RTC vector 120 provides a controller 130 in communication with the ICT 110 and computational units 140 in the microprocessor unit 100 with knowledge of the instructions stored in the ICT 110 without needing to query the ICT 110 directly, and the ability to perform a count leading ones operation to determine which entries to complete in a given clock cycle.

The instructions in the ICT 110 are processed by the computational units 140, and may read or write from various memory 150 in the microprocessor unit 100 or external to the microprocessor unit 100, including registers, storage devices, sensors, and other external devices. Once the computational units 140 have finished a given instruction, the controller 130 may update the ICT 110 and/or the RTC vector 120 to reflect that the given entry has instructions that have finished and are ready for completion. The controller 130 may then signal the computational units 140 to complete the instructions in the associated entries when the order and status of the entries in the ICT 110 allows for completion in program order.

FIGS. 2A and 2B illustrate an example RTC vector 120 associated with an ICT 110. The illustrated RTC vector 120 includes 32 entries, each corresponding to an RTC status bit 210, and the RTC vector 120 is divided into four sections 220 of 8 bits. In other embodiments, an RTC vector 120 (and associated ICT 110) may include a different number of entries, divided into a different number of sections 220, with different sizes than shown in FIG. 2, for example, a 256 entry ICT 110 may be associated with an RTC vector 120 divided into eight 32-bit sections 220.

The RTC vector 120 includes an RTC status bit 210 for each entry in the ICT 110, which may be set to $0_2$ or $1_2$ to indicate whether the associated instruction in the ICT 110 is not finished (i.e., not-ready for completion) or finished (i.e., ready for completion or completed) respectively. The RTC vector 120 may include other status bits, or other status bits may be tracked in different vectors associated with the ICT 110. In embodiments that include multiple instructions per entry in the ICT 110, the RTC status bit 210 for a given entry remains set to $0_2$ unless all instructions included in that entry are finished and ready for completion, but once all of the instructions included in that entry are finished, the RTC status bit 210 is set to $1_2$.

After an RTC status bit 210 is set to $1_2$, that RTC status bit 210 remains set to $1_2$ until the processor 100 has completed every instruction in the section 220 that the entry belongs to, at which time the processor 100 resets all of the RTC status bits 210 in the section 220 to $0_2$. For example and with reference to the illustrated RTC vectors 120, when the processor has completed entries 0 through 7 (corresponding to a first section 220), the controller 130 may begin processing entries 8 through 15 (corresponding to a second section 220) and reset the RTC status bits 210 in entries 0 through 7. In various embodiments, the controller 130 may reset the RTC status bits 210 in a section 220 in response to moving a completion window away from that section 220. For example, an initial completion window may include a first section 220, and when the controller 130 moves the completion window to no longer include the first section 220, the RTC status bits 210 in the first section 220 are reset to $0_2$.

The controller 130 begins completion of the entries within the completion window from the entry indicated by a tail pointer 230. The tail pointer 230 may begin at the initial position in the RTC vector 120 or section 220 thereof, and is updated at the transition of each clock cycle to a count leading ones 240 (i.e., the next tail pointer 230). The count leading ones 240 points to the position in the RTC vector 120 where the controller 130 stops completion for the current clock cycle, and will attempt to begin completion from (as the tail pointer 230) in the next clock cycle. In the illustrated example in FIG. 2A, the tail pointer 230 is set at position 0 and the head pointer is set to position 3. The count leading ones 240 is determined to correspond to the entry with the next non-finished entry in the ICT 110 from the current tail pointer 230, which is the first entry with an RTC status bit 210 set to $0_2$.

In one example, when the processor 100 advances to a next clock cycle, the count leading ones 240 is calculated and set as the tail pointer 230 for the next clock cycle. In another example, when the processor 100 advances to a next clock cycle, the contents of a first register (or other memory 150) associated with the count leading ones 240 may be transferred to a second register (or other memory 150) associated with the tail pointer 230 to update the tail pointer 230 for the next clock cycle. In the illustrated example in FIG. 2B, in a subsequent clock cycle to the example in FIG. 2A, where the RTC status bit 210 for entry 3 is set to $1_2$, the tail pointer 230 is set to position 3 (the count leading ones 240 of the earlier clock cycle), and the count leading ones 240 is set to position 6 (corresponding to the next non-finished entry). In embodiments in which RTC status bit 210 for the entry pointed to by the tail pointer 230 is still set to $0_2$, the count leading ones 240 points to the same entry as the tail pointer 230.

Figure 3:
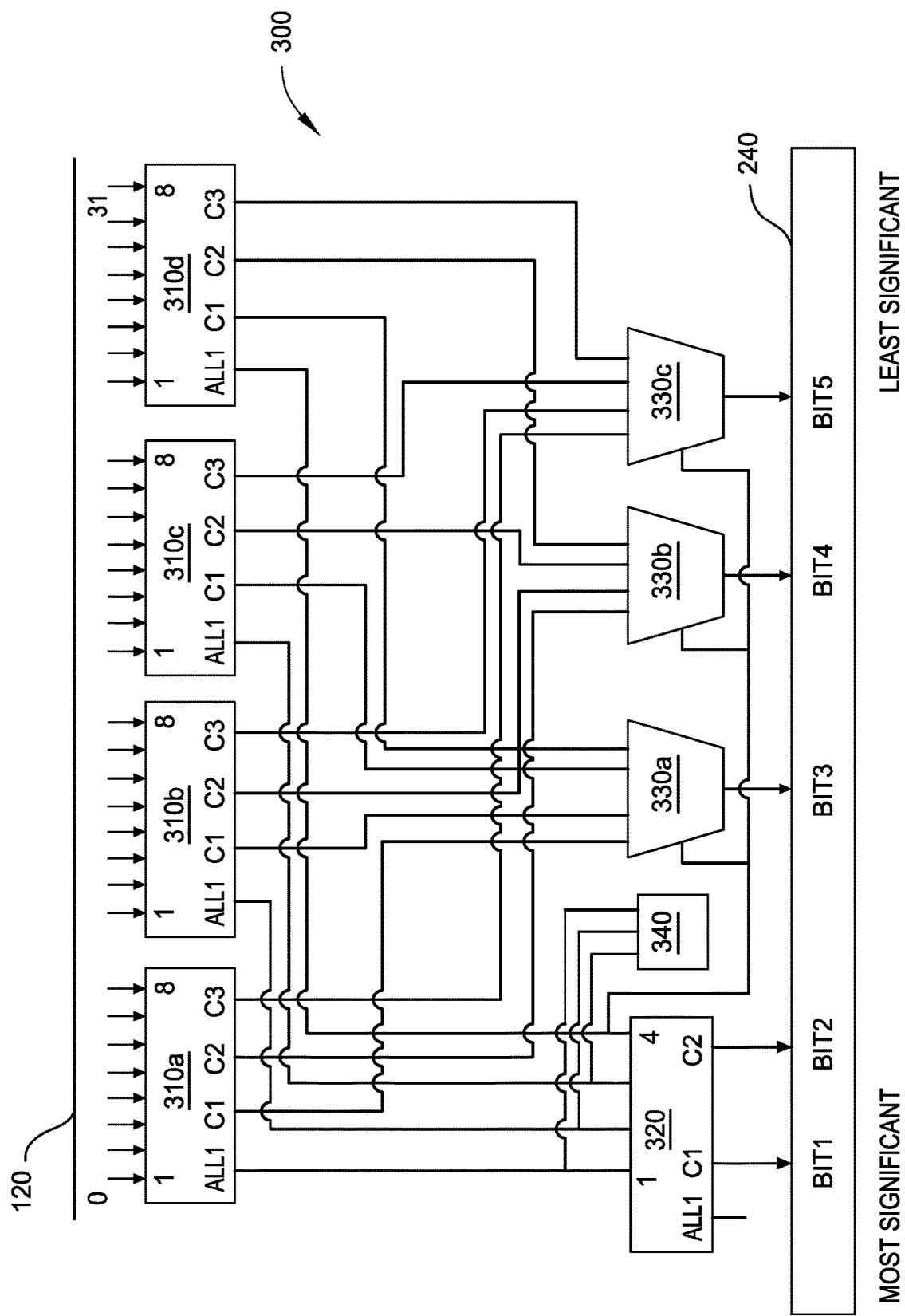
FIG. 3 illustrates an example circuit for determining a head pointer via a count leading ones approach, according to aspects of the present disclosure.

FIG. 3 illustrates an example circuit 300 for determining a location in an ICT 110 that a count leading ones 240 points to using a count leading ones approach for a 32-bit section 220. The example circuit 300 is configured to determine the count leading ones 240 for a section 220 by examining the RTC status bits 210 in that section and returning an output sized for that section 200. The example circuit 300 in FIG. 3 examines a 32-bit RTC vector and produces a 5-bit output, but in other embodiments, a section 220 of X-bits may be used, and the number of bits in the output are matched to provide a value of at least X For example, when using sections 220 of 32 bits (i.e., X=32), the number of bits in the output N may be set to five (when X=32, $2^5$=32, ∴ N=5), but when using sections 220 of 8 bits (i.e., X=8), N may be set to three (when X=8, $2^3$=32, ∴ N=3).

The circuit 300 in FIG. 3 includes four word-reducing encoders 310a-d (generally, word-reducing encoder 310) associated with particular bits in the RTC vector 120 as inputs. A first word-reducing encoder 310a corresponds to the most-significant bits of the RTC vector 120, a second word-reducing encoder 310b which corresponds to the next-most significant bits of the RTC vector 120, and so on. In the illustrated circuit 300, the word-reducing encoders 310 have an 8:3 reduction ratio; taking eight bits as inputs and outputting three coded bits ($C_1$, $C_2$, $C_3$) and one All bit ($A_1$). A logic diagram 410 for an 8:3 word-reducing encoder 310 is illustrated in FIG. 4A. The logic diagram 410 of FIG. 4A indicates what the values of the output bits ($A_1$, $C_1$, $C_2$, $C_3$) are for a given values of input RTC status bits 210 from the RTC vector 120.

The outputs from the word-reducing encoders 310 are then used as inputs for an all-reducing encoder 320, three 4:1 multiplexers 330a-c (generally, MUX 330), and a 32:5 prioritizer 340.

Figure 4B:
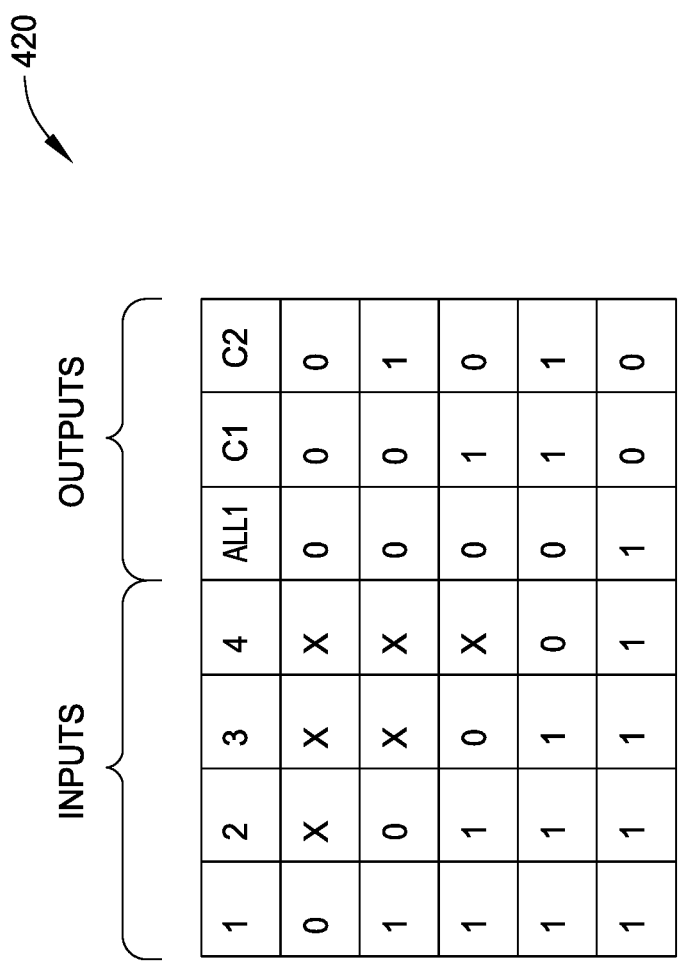

The all-reducing encoder 320 receives the All bits output from each of the word reducing encoders 310 as inputs. In the illustrated circuit 300, the all-reducing encoder 320 has a 4:2 reduction ratio; taking four bits as inputs and outputting two coded bits ($C_1$, $C_2$) and one All bit ($A_1$). A logic diagram 420 for a 4:2 all-reducing encoder 320 is illustrated in FIG. 4B. The logic diagram 420 of FIG. 4B indicates what the values of the output bits ($A_1$, $C_1$, $C_2$) are for a given values of input All bits from the word-reducing encoders 310. In some embodiments, the controller 130 receives the All bit ($A_1$) output by the all-reducing encoder 320 to determine when a section 220 of the ICT 110 is fully completed, and a next section 220 should be transitioned to for completion processing.

The prioritizer 340 receives the All bits output from each of the word reducing encoders 310 as inputs to determine the first (i.e., least significant) corresponding segment of the RTC vector 120 that is not completely set to $1_2$. The first MUX 340a receives the $C_1$ bit output from each of the word-reducing encoders 310 as inputs, the second MUX 340b receives the $C_2$ bit output from each of the word-reducing encoders 310 as inputs, and the third MUX 340c receives the $C_3$ bit output from each of the word-reducing encoders 310 as inputs. The prioritizer 340 controls the MUXes 340 to output the input ($C_1$, $C_2$, or $C_3$) received from the word-reducing encoder 310 determined to correspond to the least significant portion of the RTC vector 120 whose bits are not completely set to $1_2$. For example, if the prioritizer 340 determines that the first word-reducing encoder 310a corresponds to the least-significant portion of the RTC vector 120 not completely set to $1_2$, the MUXes 340a-c output the corresponding bits $C_1$, $C_2$, and $C_3$ received from the first word-reducing encoder 310a. In another example, if the prioritizer 340 determines that the second word-reducing encoder 310b corresponds to the least-significant portion of the RTC vector 120 not completely set to $1_2$, the MUXes 340a-c output the corresponding bits $C_1$, $C_2$, and $C_3$ received from the second word-reducing encoder 310b.

The outputs from the all-reducing encoder 320 and the MUXes 330 are combined to form the count leading ones 240. In the illustrated example of a 5-bit count leading ones 240, the bits are assembled such that the output $C_1$ of the all-reducing encoder 320 corresponds to the most significant bit ($1xxxx_2$ or $0xxxx_2$), the output $C_2$ of the all-reducing encoder 320 corresponds to the second-most significant bit ($x1xxx_2$ or $x0xxx_2$), the output of the first MUX 330a corresponds to the third-most significant bit ($xx1xx_2$ or $xx0xx_2$), the output of the second MUX 330b corresponds to the fourth-most significant bit ($xxx1x_2$ or $xxx0x_2$), and the output of the third MUX 330b corresponds to the least significant bit in the count leading ones 240 ($xxxx1_2$ or $xxxx0_2$).

As will be appreciated, depending on the indexing scheme, and the size of the ICT 110 and the sections 220 thereof, adjustments may be made to the circuit 300 or the interpretation of the output thereof. For example, the illustrated circuit 300 produces a count leading ones 240 that may be used in a 0-first indexing scheme as-is, but in a 1-first indexing scheme should be interpreted with an offset; e.g., an output of $00000_2$ from the circuit 300 produces a count leading ones 240 that points to the least-significant position in the ICT 110, whether interpreted as 0 or 1.

FIG. 4A is a logic diagram 410 for an 8:3 priority encoder. Inputs to the 8:3 priority encoder may be TRUE ($1_2$), FALSE ($0_2$), or immaterial ($1_2$ or $0_2$ with no effect on the outputs; indicated as $x_2$). A given row of inputs having the values noted in the logic diagram 410 produces the outputs in the same row of the logic diagram 410. Outputs from the 8:3 priority encoder may be TRUE ($1_2$) or FALSE ($0_2$). When used as a word-reducing encoder 310 (as in circuit 300), the inputs accept eight RTC status bits 210 and the outputs include three encoded bits and one all bit (indicating TRUE when all inputs indicate TRUE).

FIG. 4B is a logic diagram 420 for a 4:2 priority encoder. Inputs to the 4:2 priority encoder may be TRUE ($1_2$), FALSE ($0_2$), or immaterial ($1_2$ or $0_2$ with no effect on the outputs; indicated as $x_2$). A given row of inputs having the values noted in the logic diagram 420 produces the outputs in the same row of the logic diagram 420. Outputs from the 4:2 priority encoder may be TRUE ($1_2$) or FALSE ($0_2$). When used as an all-reducing encoder 320 (as in circuit 300), the inputs accept four all bits, one from each word-reducing encoder 310, and the outputs include two encoded bits and one all bit (indicating TRUE when all inputs indicate TRUE).

Figure 5:
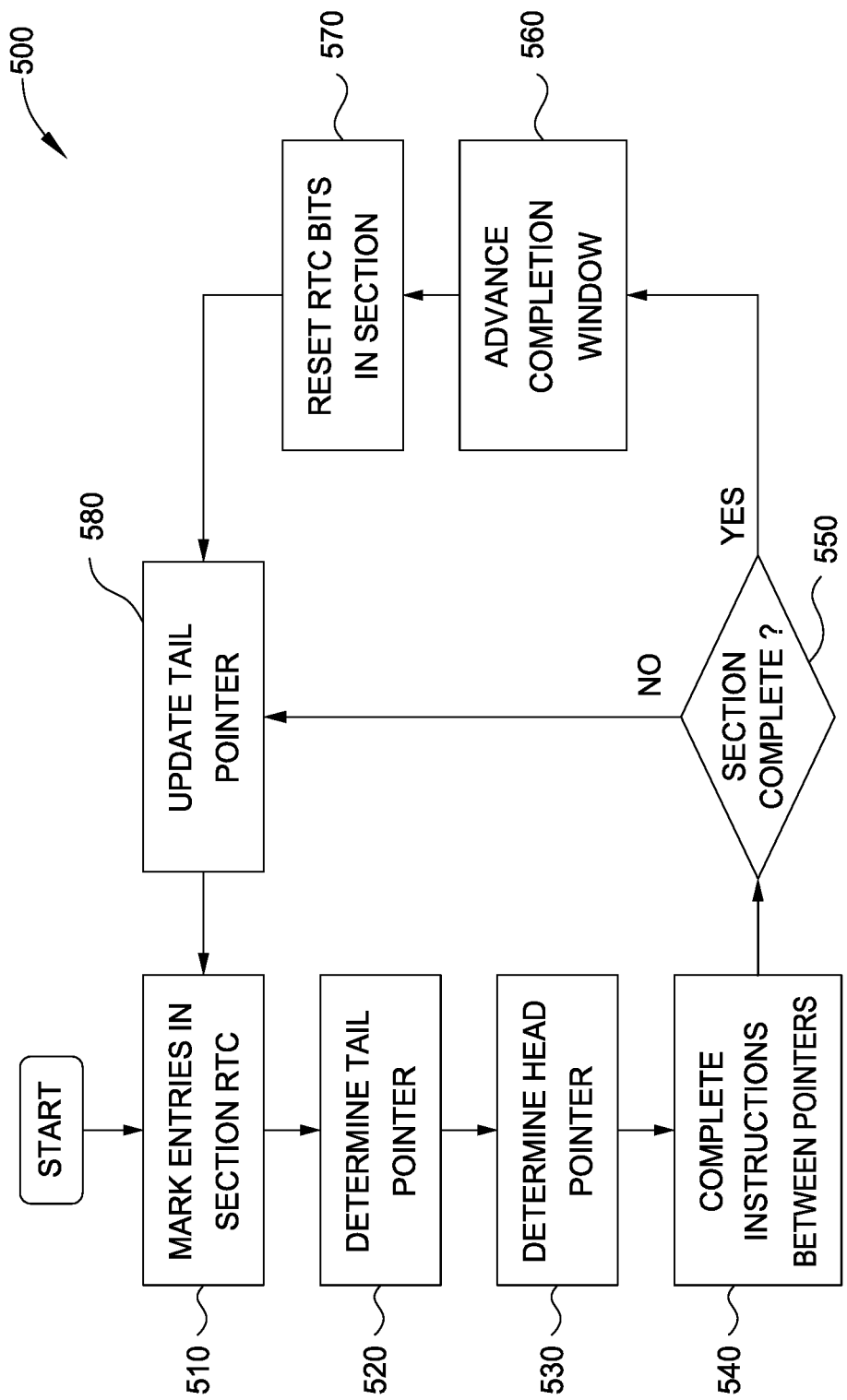
FIG. 5 is a flowchart of an example method of a completion mechanism for a microprocessor instruction completion table using count leading ones and persistent status bits, according to aspects of the present disclosure.

FIG. 5 is a flowchart of an example method 500 of a completion mechanism for a microprocessor instruction completion table using count leading ones and persistent status bits. Method 500 begins at block 510, where a controller 130 in a processor 100 marks entries in currently completing section 220 in the ICT 110 that are ready to complete. The controller 130 marks a given entry as ready to complete when all of the instructions included in a given entry have finished, and no other condition prevents the instructions from completing. Each RTC status bit 210 in the RTC vector 120 associated with the ICT 110 corresponds to one entry in currently completing section 220 in the ICT 110, and the controller sets that RTC status bit 210 to $1_2$ when the corresponding entry is ready to complete. Although the entries are ordered in the ICT 110 according to the program order, the instructions included in those entries may finish in any order; the RTC status bits 210 provide the controller 130 status information for which entries are ready to complete so that the controller 130 may ensure completion in the program order despite the instructions finishing in a (potentially) different order that is independent from the program order.

At block 520, the controller 130 determines the tail pointer 230 for the current clock cycle. The tail pointer 230 may be stored in a register or other memory 150 accessible by the controller 130 to define a starting position in the ICT 110 from which the controller 130 may attempt to complete instructions from the ICT 110 that are marked as ready to complete.

At block 530, the controller 130 determines the count leading ones 240 for the current clock cycle. The count leading ones 240 defines an ending position in the ICT 110 from which the controller 130 may attempt to complete instructions from the ICT 110 that are marked as ready to complete. The count leading ones 240 may be determined from the RTC status bits 210 organized into an RTC vector 120 that the controller 130 analyzed according to a count-leading ones process, such as via the circuit 300 described in relation to FIG. 3.

At block 540, the controller 130 attempts to complete entries in the ICT 110 located between the tail pointer 230 and the count leading ones 240. For example, with a tail pointer 230 indicating position 1, and a count leading ones 240 indicating position 16, the controller 130 completes the instructions in entries 1 up to 16; stopping completion at position 16. In another example, with a tail pointer 230 and the count leading ones 240 indicating position 16, the controller 130 does not complete any instructions. In a further example, with the tail pointer 230 indicating position 28 and the count leading ones 240 indicating position 1, the controller completes the instructions in entries 28 up to 1; stopping completion at the last entry in the section 220 being processed for completion in the current clock cycle and fully completing the section 220.

At block 550, the controller 130 determines whether the currently completing section 220 has been fully completed. For example, in a section 220 of 32 entries, once all 32 entries have been completed, the controller 130 determines that the current section 220 has been fully completed, and a next section 220 of the ICT 110 should be processed for completion of the entries therein. In some embodiments, the controller 130 determines that the current section is fully completed in response every RTS status bit 210 in the RTC vector 120 being set to $1_2$. In response to determining that the current section 220 is fully completed, method 500 proceeds to block 560. In response to determined that the current section 220 is not fully completed, method 500 proceeds to block 580.

At block 560, the controller 130 advances the completion window in the ICT 110 from a currently analyzed section 220 to a next section in the ICT 110. At block 570, in response to the controller 130 advancing to the next section 220, the controller 130 resets the RTC status bits 210 from $1_2$ to $0_2$. Once set to $1_2$, in response to the included instructions being ready to complete, a given RTC status bit 210 stays set to $1_2$ until reset to $0_2$ at block 570 when the controller 130 advances the completion window away from the section 220; the RTC status bits 210 have persistent values for a set completion window.

At block 580, the controller 130 updates the tail pointer 230 for the subsequent clock cycle to the value of the count leading ones 240 from the current clock cycle. For example, when a count leading ones 240 for a first clock cycle points to position 8, the tail pointer 230 for the second clock cycle is updated to point to position 8. In another example, when the count leading ones 240 for a first clock cycle points to position 1, such as when the RTC vector 120 is set to all $1_2$s, the tail pointer 230 for the second clock cycle updates to point to the initial position for the next section 220. In various embodiments, the tail pointer 230 may be updated to the value of the count leading ones 240 at the end of a current clock cycle (i.e., after block 540) or at the beginning of a next clock cycle (i.e., before block 510). (The value of the count leading ones 240 may be updated in the subsequent clock cycle when block 530 is returned to.) Method 500 then returns to block 510 to mark entries in a noted section 220 as ready to complete.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   marking entries in a section of an Instruction Completion Table (ICT) as ready to complete using corresponding Ready to Complete (RTC) status bits;
   determining a tail pointer indicating a start of the entries in the ICT that are ready for completion in a current clock cycle;
   performing a counting leading ones on an RTC vector that organizes the RTC status bits according to a program order for completing the entries to determine a count leading ones pointer that indicates an end of the entries in the ICT that are ready for completion in the current clock cycle;
   completing instructions included in the entries between the tail pointer and the count leading ones pointer in one clock cycle; and
   updating the tail pointer to a value of the count leading ones pointer for a subsequent clock cycle.

2. The method of claim 1, further comprising:
   in response to determining that the section is fully completed, advancing a completion window from the section to a next section of the ICT for the subsequent clock cycle.

3. The method of claim 2, wherein values of the corresponding RTC bits persist after completion of the instruction included in the entries until all RTC bits are reset in response to advancing the completion window from the section to a subsequent section of the ICT.

4. The method of claim 1, wherein each entry includes more than one instruction.

5. The method of claim 1, wherein the tail pointer is updated to the value of the count leading ones pointer at one of:
- a beginning of the subsequent clock cycle; and
- an end of the current clock cycle.

6. The method of claim 1, wherein when the tail pointer and the count leading ones pointer point to one position in the ICT point, completing the instructions included in the entries from the start position to the end position completes no instructions.

7. The method of claim 1, wherein the instructions included in the entries are finished and set as ready to complete in an order independent of the program order.

8. A system, comprising:
- an Instruction Completion Table (ICT) including a plurality of entries arranged in a program order for completion;
- a Ready to Complete (RTC) vector including a plurality of RTC status bits corresponding to the plurality of entries included in the ICT; and
- a controller, embodying logic that enables the controller in a given clock cycle to:
  - mark one or more entries of the ICT being ready to complete using a corresponding one or more RTC status bits;
  - determine a tail pointer that indicates a start position for completion in the ICT in the given clock cycle;
  - count leading ones in the RTC vector to determine a count leading ones pointer that indicates an end position for completion in the ICT in the given clock cycle;
  - complete the instructions included in the entries from the tail pointer to the count leading ones pointer; and
  - update the tail pointer to a value of the count leading ones pointer for a subsequent clock cycle.

9. The system of claim 8, further comprising:
in response to determining that a section of the ICT is fully completed, advancing a completion window from the section to a next section of the ICT for the subsequent clock cycle.

10. The system of claim 9, wherein values of the RTC status bits persist after completion of the instructions in a given entry and are reset in response to advancing the completion window from the section to a subsequent section of the ICT.

11. The system of claim 8, wherein each entry includes more than one instruction.

12. The system of claim 11, wherein when the start position and the end position in the ICT point to one position, completing the instructions included in the entries from the start position to the end position completes no instructions.

13. The system of claim 11, wherein the instructions included in the entries are finished and set as ready to complete in an order independent of the program order.

14. A computer program product for using count leading ones and persistent status bits in a completion mechanism for a microprocessor, the computer program product comprising:
- a computer-readable storage medium having computer-readable program code embodied therewith, the computer-readable program code executable by one or more computer processors to:
  - mark entries in a section of an Instruction Completion Table (ICT) as ready to complete based on the instruction included in the entries having finished processing, wherein a given entry is marked as ready to complete via a corresponding Ready to Complete (RTC) status bit being set;
  - determine a tail pointer that indicates a start position in the ICT in a current clock cycle;
  - perform a counting leading ones on an RTC vector including the RTC status bits organized according to a program order for completing the entries to determine a count leading ones pointer that indicates an end position in the ICT in the current clock cycle;
  - complete the instructions included in the entries from the tail pointer to the count leading ones pointer; and
  - update the tail pointer to a value of the count leading ones pointer for a subsequent clock cycle.

15. The computer program product of claim 14, further comprising:
in response to determining that the section is fully completed, advancing a completion window from the section to a next section of the ICT for the subsequent clock cycle.

16. The computer program product of claim 15, wherein a value of the corresponding RTC bit persists after completion of the instructions in the given entry until all RTC bits are reset in response to advancing the completion window from the section to a subsequent section of the ICT.

17. The computer program product of claim 14, wherein each entry includes more than one instruction.

18. The computer program product of claim 14, wherein the tail pointer is updated to the value of the count leading ones pointer at one of:
- a beginning of the subsequent clock cycle; or
- an end of the current clock cycle.

19. The computer program product of claim 14, wherein when the start position and the end position in the ICT point to one position, completing the instructions included in the entries from the start position to the end position completes no instructions.

20. The computer program product of claim 14, wherein the instructions included in the entries are finished and set as ready to complete in an order independent of the program order.

\* \* \* \* \*